(12) United States Patent
Wilken et al.

(10) Patent No.: US 9,807,938 B2
(45) Date of Patent: Nov. 7, 2017

(54) HARVESTING SYSTEM HAVING A SELF-PROPELLED HARVESTING MACHINE

(71) Applicant: CLAAS SELBSTFAHRENDE ERNTEMASCHINEN GMBH, Harsewinkel (DE)

(72) Inventors: Andreas Wilken, Bissendorf (DE); Christoph Heitmann, Warendorf (DE); Bastian Bormann, Guetersloh (DE); Joachim Baumgarten, Beelen (DE); Sebastian Neu, Bad Laer (DE); Boris Kettelhoit, Guetersloh (DE); Thilo Krause, Glinde (DE); Christoph Bussmann, Harsewinkel (DE); Henner Voecking, Rietberg (DE); Felix Herter, Harsewinkel (DE)

(73) Assignee: CLAAS SELBSTFAHRENDE ERNTEMASCHINEN GMBH, Harsewinkel (DE)

(*) Notice: Subject to any disclaimer, the term of this patent is extended or adjusted under 35 U.S.C. 154(b) by 91 days.

(21) Appl. No.: 15/132,433

(22) Filed: Apr. 19, 2016

(65) Prior Publication Data
US 2016/0309656 A1 Oct. 27, 2016

(30) Foreign Application Priority Data
Apr. 24, 2015 (DE) .......................... 10 2015 106 302

(51) Int. Cl.
*A01F 12/18* (2006.01)
*A01D 41/127* (2006.01)
(Continued)

(52) U.S. Cl.
CPC .......... *A01F 12/184* (2013.01); *A01D 41/127* (2013.01); *A01F 12/18* (2013.01); *G05B 13/02* (2013.01); *G05B 17/02* (2013.01)

(58) Field of Classification Search
CPC ....... A01F 12/184; A01F 12/18; G05B 13/02; G05B 17/02; A01D 41/127
See application file for complete search history.

(56) References Cited

U.S. PATENT DOCUMENTS 6,128,574 A * 10/2000 Diekhans ............ A01L 379/005
                                                            701/410
7,670,218 B2    3/2010 Behnke et al.
(Continued)

FOREIGN PATENT DOCUMENTS

DE   102009009767   8/2010
DE   102010038661   2/2012
(Continued)

*Primary Examiner* — Richard Camby
(74) *Attorney, Agent, or Firm* — Collard & Roe, P.C.

(57) ABSTRACT

A self-propelled harvesting machine such as a combine harvester has multiple working units for processing crop picked up from a field, a driver assistance system for the sensor-supported control of the working units, an environmental sensor system for detecting environmental information and spatial areas of applicability located in the environment of the harvesting machine. The driver assistance system has a memory for storing data and a computing unit for processing data, including the data stored in the memory. A functional system model for at least one part of the harvesting machine is stored in the memory. The computing unit functions as a characteristic control on the basis of the system model and autonomously determines machine parameters of at least one working unit and specifies these to the particular working unit.

22 Claims, 4 Drawing Sheets

(51) Int. Cl.
*G05B 13/02* (2006.01)
*G05B 17/02* (2006.01)

(56) References Cited

U.S. PATENT DOCUMENTS

| | | |
|---|---|---|
| 8,406,964 B2 | 3/2013 | Baumgarten et al. |
| 8,909,389 B2 | 12/2014 | Meyer |
| 9,125,344 B2 | 9/2015 | Baumgarten et al. |
| 9,403,536 B2 | 8/2016 | Bollin et al. |
| 2003/0182259 A1* | 9/2003 | Pickett ................. A01B 79/005 |
| 2012/0245802 A1* | 9/2012 | Schlesser ........... A01D 41/1243 |
| | | 701/50 |
| 2013/0205733 A1 | 8/2013 | Peters |

FOREIGN PATENT DOCUMENTS

| | | |
|---|---|---|
| DE | 102011085380 | 5/2013 |
| EP | 1 543 712 | 6/2005 |
| EP | 1 902 609 | 3/2008 |
| EP | 2 687 924 | 1/2014 |
| EP | 2 728 523 | 5/2014 |
| EP | 2 837 279 | 2/2015 |

* cited by examiner

US 9,807,938 B2

HARVESTING SYSTEM HAVING A SELF-PROPELLED HARVESTING MACHINE

CROSS-REFERENCE TO RELATED APPLICATIONS

The invention described and claimed hereinbelow is also described in German Patent Document DE 10 2015 106 302.6, filed on Apr. 24, 2015. The German Patent Application, the subject matters of which is incorporated herein by reference, provides the basis for a claim of priority of invention under 35 U.S.C. 119(a)-(d).

BACKGROUND OF THE INVENTION

The invention relates to a harvesting system having a self-propelled harvesting machine comprising multiple working units for processing crop picked up from a field, a driver assistance system for sensor-supported control of the working units, the driver assistance system comprising a memory for storing data and a computing unit for processing the data and an environmental sensor system for detecting environmental information that influences a harvesting process and has a spatial area of applicability located in an environment of the harvesting machine.

Self-propelled harvesting machines such as combine harvesters, forage harvesters, or the like are assigned a plurality of machine parameters, which must be adjusted during the harvesting process. By adjusting these machine parameters, an at least partially autonomous adjustment and optimization of the relevant harvesting-process parameters can be achieved.

A self-propelled harvesting machine designed as a combine harvester is used for mowing and for threshing grain. Assigned to the harvesting machine are a number of working units, such as a header, a threshing unit, a separation system, a cleaning system, and a spreader system. The threshing unit obtains grain from the crop picked up by the combine harvester by the header, which grain, after threshing, separation, and subsequent cleaning, is fed to a grain tank. The chaff and the straw, for example, remain as further components of the crop and are either spread onto the field or, in the case of straw, can be set down as swath, e.g., to be subsequently picked up by a baler. Here and in the following, the term "crop" is intended to mean the entirety of the crop stream picked up by the threshing unit, i.e., including the grains that have not yet been obtained as grain from the crop, the grains that may remain in the crop stream as a loss and that may be deposited with the straw.

In the threshing unit, the grain is rubbed, i.e., threshed, out of the straw by a processing, which is rolling, in principle, and is separated from the remaining crop stream, so that it can be fed directly to the cleaning system. The remaining crop stream is then fed to the separation area in which the remaining grain is separated from the crop stream, e.g., by a straw-walker system and is then likewise fed to the cleaning system.

DE 10 2009 009 767 A1 discloses a harvesting system comprising a combine harvester having a driver assistance system that measures different harvesting-process parameters on the combine harvester and checks them to determine whether they pass into a critical value range or exceed or undershoot critical limit values. If this situation occurs, the driver assistance system interactively communicates with the driver by proposing to the driver measures to take to optimize the control of the threshing unit that are intended for moving out of the critical value range. In this case, assigned to the driver assistance system is a harvesting-process sensor system comprising a plurality of harvesting-process sensors, with which different harvesting-process parameters resulting from the harvesting process can be determined. The harvesting-process parameters provide information about the on-going harvesting process and form the basis for the aforementioned optimization.

A disadvantage of the aforementioned harvesting machine comprising a harvesting-process sensor system, which determines different harvesting-process parameters, is the fact that the adjustment of a set harvesting-process state is always associated with a certain start-up process until the target harvesting-process state is reached. This is due, primarily, to the fact that the harvesting-process parameters used as the basis for the optimization are themselves dependent upon the harvesting process.

Harvesting machines that access environmental sensor signals for the purpose of adjusting machine parameters are also known. One example of this is the predictive, sensor-based determination of properties of the field crop using environmental sensors, which can be located on the harvesting machine (DE 10 2011 085 380 A1). One example of this is the predictive, sensor-based determination of properties of the field crop by means of environmental sensors, which are located on an aircraft (DE 10 2010 038 661 A1).

A disadvantage of the known harvesting systems comprising environmental sensors is that the incorporation of the resultant sensor signals into the control of the working units is not very systematic. A systematic improvement of the aforementioned start-up behavior therefore cannot be achieved.

SUMMARY OF THE INVENTION

The present invention overcomes the shortcomings of known arts, such as those mentioned above.

To that end, the present invention provides a harvesting system that controls of the working units of a self-propelled harvesting machine to optimize start-up behavior and a self-propelled harvesting machine.

The inventive self-propelled harvesting machine provides for environmental information to flow into a characteristic control, with which environmental information effective control of the working units is achieved via the on-going, working unit-specific adjustment of machine parameters, in order to further improve the start-up behavior.

According to the invention, a functional system model for at least one part of the combine harvester is stored in the memory of a driver assistance system, which system model forms the basis for the autonomous, determination of the at least one threshing-unit parameter. The term "functional system model" means that at least a portion of the functional interrelationships within the harvesting machine are depicted by the system model.

For clarity, it should be noted that the term "environment" is directed to the environment of the self-propelled harvesting machine. Therefore, environment as used herein does not relate to anything that takes place within the combine harvester. Assigned to the environmental information is a spatial area of applicability located in the environment of the harvesting machine. The spatial area of applicability of a portion of environmental information determines which spatial area in the environment of the harvesting machine is described by this portion of environmental information.

The accounting of environmental information according to the invention is advantageous insofar as this information can influence the harvesting process, but is usually independent of the harvesting process.

In an embodiment, two alternatives are used for the accounting of the at least one portion of environmental information according to the invention.

In a first alternative, it is proposed to define or modify the system model on which the characteristic control is based, depending on at least one portion of the environmental information. This definition is carried out, for example, by making a selection of families of characteristics depending on the environmental information. The modification is carried out by a parameterization of the applicable families of characteristics depending on at least one portion of environmental information.

In a second alternative, a control circuit based on at least one portion of environmental information is superimposed on the characteristic control. Very generally, this means that an adaptation of machine parameters "beyond the characteristic control" is possible.

It should be noted that the term "control" should be broadly interpreted in the present case. The term "control" covers not only a control in the narrower sense, in which feedback within the sense of a regulation is not provided, but also covers a regulation in which such feedback is specifically provided.

In an embodiment, at least one working unit, together with the driver assistance system, forms at least one automated working unit. This means that the driver assistance system, with its memory for storing data and with its computing unit, is designed to autonomously determine, on the basis of the system model, individual machine parameters of the working unit and to assign them to the threshing unit. The basis for the determination of the machine parameters is a selection, made by the user, of harvesting process strategies stored in the memory of the driver assistance system.

By implementation of at least one automated working unit according to the invention, a manner of controlling the working unit is specified by a single selection of the active harvesting-process strategy. Another entry by the driver is not required in order for the machine parameters to be determined, in the narrower sense. The driver has the ability of changing the selected harvesting-process strategy if so desired, however, so that autonomous control subsequently continues, although possibly with a different prioritization.

In another embodiment, not only is the environmental information taken into consideration, but so are harvesting-process parameters resulting from the on-going harvesting process. In this variant, the control of the working units is therefore carried out based not only on environmental information that is largely independent of the harvesting process, but also based on harvesting-process parameters that result from the harvesting process and are therefore dependent upon the harvesting process.

In an embodiment, implementation of a central data preparation unit provides for generating environmental information from environmental sensor data in a particularly flexible manner. The environmental sensor data is sensor data, which is still unprocessed or has been merely pre-processed and from which the sensor signals are obtained. Such sensor data can be physical distance data, image data, or the like. The environmental information, however, relates to the values of variables whose value has a reproducible effect on the harvesting process. In principle, the data preparation unit merely transfers the environmental sensor signals of individual environmental sensors to the driver assistance system.

Using the data preparation unit, a "bundling", as it were, of the environmental sensor signals is possible in such a way that the existence of the multiple sensors can be better utilized in terms of information technology. One example of this is the generation of a redundancy with respect to a portion, piece or unit of environmental information, in that the environmental information is based on multiple environmental sensor signals having the same information content. Another example is the generation of a portion, piece or unit of environmental information from multiple environmental sensor signals having different information content. Such environmental information portion or piece simply could not be generated by only one environmental sensor.

In one form, the environmental sensors relate to numerous different aspects of the environment of the harvesting machine. This includes, for example, environmental information relating to the field crop, environmental information relating to the geometric conditions of the field comprising the field crop, or environmental information relating to the field environment.

The areas of applicability of the particular pieces or portions of environmental information are incorporated into the determination of the machine parameters. Therefore, the adjustment of the machine parameters is determined in a predictive manner for a process time located in the future, which counteracts a tendency to oscillate in the adjustment of a set process state.

The invention also relates to possible interrelationships between environmental information and machine parameters, which can be implemented by the inventive harvesting system or self-propelled harvesting machine, using the working unit "threshing unit" as an example.

In an embodiment, the environmental information is taken into account by a ground drive control of the self-propelled harvesting machine, in particular in the adjustment of the ground speed to enable a specified crop throughput to be guaranteed. In the temporally predictive accounting of the environmental information "crop density," for example, the material feed height, which represents the throughput, can be easily adjusted to a specified value.

BRIEF DESCRIPTION OF THE DRAWINGS

Further details, features, objectives, and advantages of the present invention are explained in greater detail in the following on the basis of the drawing of a preferred exemplary embodiment. In the drawings.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

A harvesting system, according to the invention, having a self-propelled harvesting machine, can be designed for different applications. While the following description focuses on a self-propelled harvesting machine "combine harvester," the comments made with respect to the combine harvester apply similarly to all other types of self-propelled harvesting machines, in particular, to a forage harvester. For that matter, the harvesting system may comprise multiple harvesting machines, without deviating from the scope and spirit of the invention.

Figure 1:
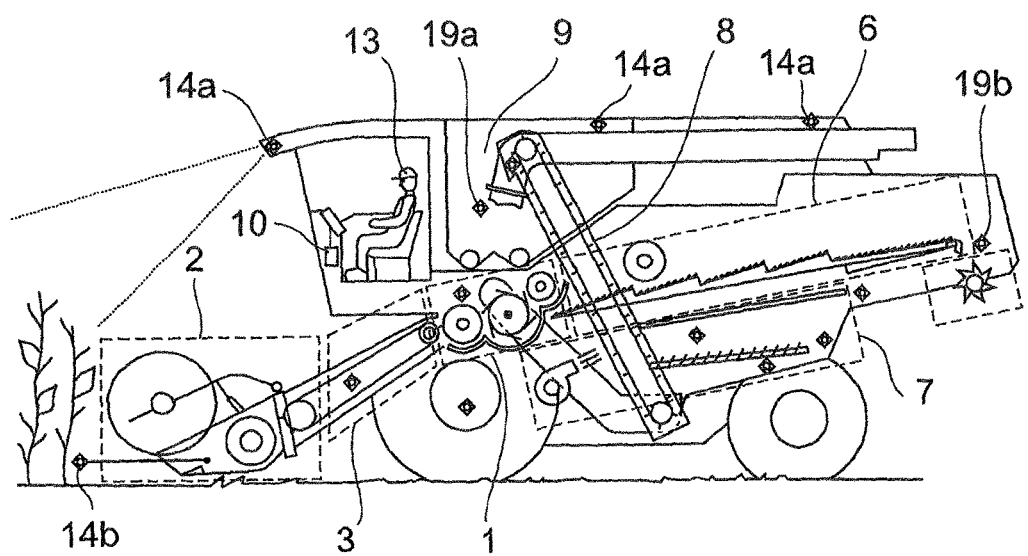
FIG. 1 depicts a side view of a combine harvester according to the invention.

The illustrated combine harvester embodiment depicted in FIG. 1 comprises a threshing unit 1 for threshing picked-up crop to obtain grain. Crop is intended to mean an entirety of material that is picked up from the field crop and fed to the threshing unit 1, wherein grain refers to the kernels to be obtained from the crop by the combine harvester. As is apparent from FIG. 1, a field crop is mowed by a working unit of the combine harvester designed as a header 2 and the crop obtained as a result is fed by a slope conveyor 3 to the threshing unit 1.

The threshing unit 1 is equipped with a threshing drum 4, which interacts with a threshing concave 5. A separation system 6 is disposed downstream from the threshing unit 1 in terms of processing. The crop stream fed to the threshing unit 1 is therefore subsequently fed, without the grain already obtained here, to the separation system 6.

The threshing unit 1 is used to rub the preponderant portion of the grain out of the straw of the crop by the threshing process. In the working unit designed as a separation system 6, the crop is then moved, e.g., shaken, along with the grain portion remaining therein, in such a way that the remaining grain also is separated from the straw and the rest of the crop. The grain obtained in the threshing unit 1 and in the separation system 6 is then fed to the working unit designed as a cleaning system 7. In the cleaning system 7, which usually has multiple stages, material other than grain, e.g., chaff and straw parts, which has been carried along in the grain up to this point, as well as non-threshed material, such as ear tips or awns, are separated from the grain. The cleaned grain then passes via a transport system 8, e.g., a grain elevator, into a grain tank 9. The threshed straw, i.e., the crop remaining in the separation system 6, is deposited by the combine harvester, e.g., as swath, along the wheel track.

The aforementioned working units can each be controlled via the specification of different machine parameters. An aforementioned threshing unit 1 can be controlled, for example, via the specification of different threshing-unit parameters. Depending on the design of the combine harvester 1, the machine parameters include, for example, a drum speed $1a$ or any other motional characteristic values of the threshing drum 4, and a concave width $1b$, i.e., the spacing between the threshing drum 4 and a threshing concave 5 (see FIG. 3). Provided the threshing unit 1 comprises filler plates, the filler plates also may be adjusted within the scope of the control of the threshing unit 1.

Figure 3:
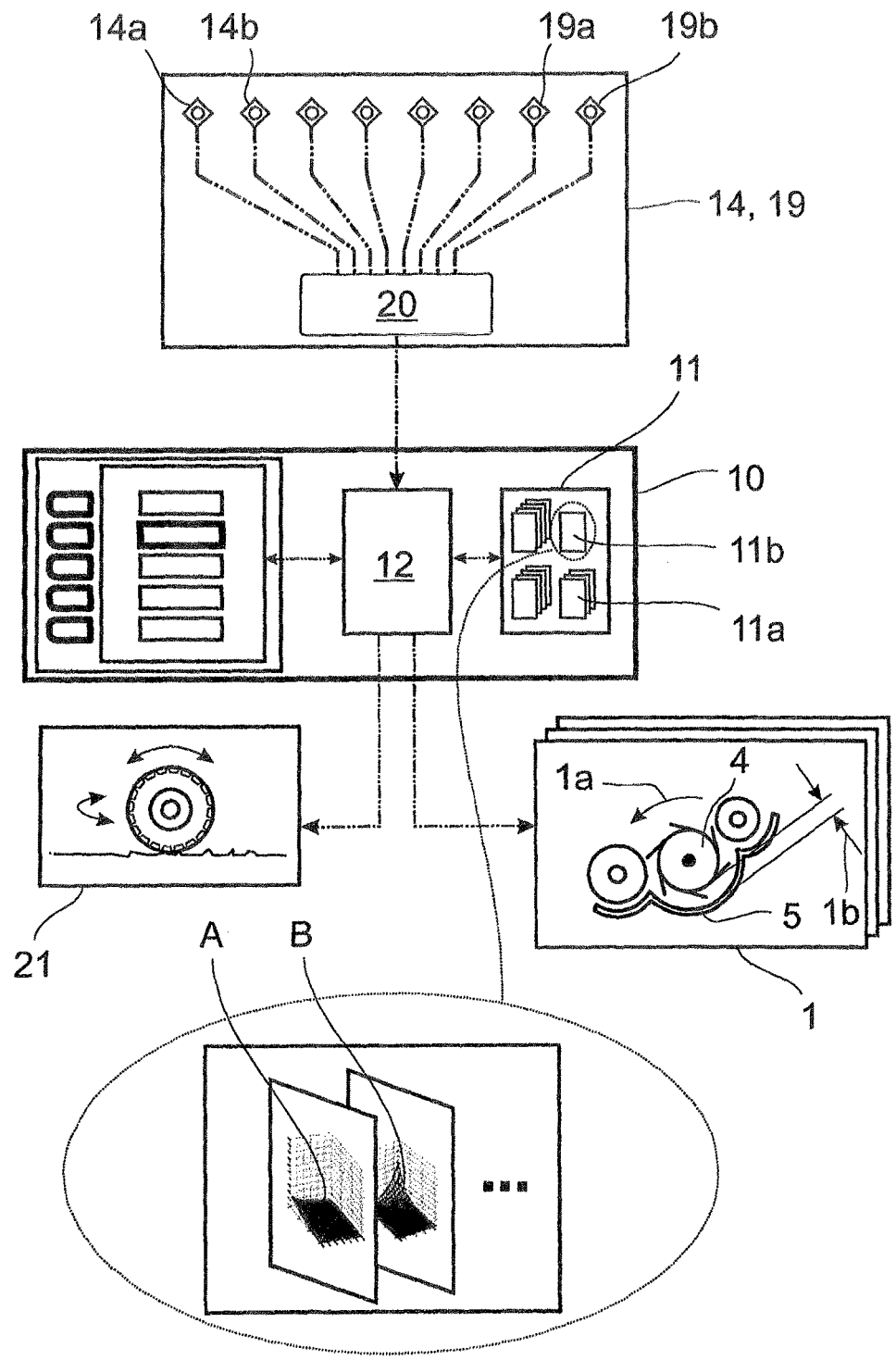
FIG. 3 depicts a schematic illustration of the driver assistance system of the combine harvester according to FIG. 1.

The harvesting machine further comprises a driver assistance system 10 for the sensor-supported control of the working units. The driver assistance system 10 comprises a memory 11 for storing data, i.e., a memory in the sense of information technology, and a computing unit 12 for processing, e.g., the data stored in the memory 11. The driver assistance system is designed to support a driver 13 of the combine harvester during the operation of the combine harvester. The driver assistance system 10 comprising the memory 11 and the computing unit 12 is schematically shown in FIG. 3.

Figure 2:
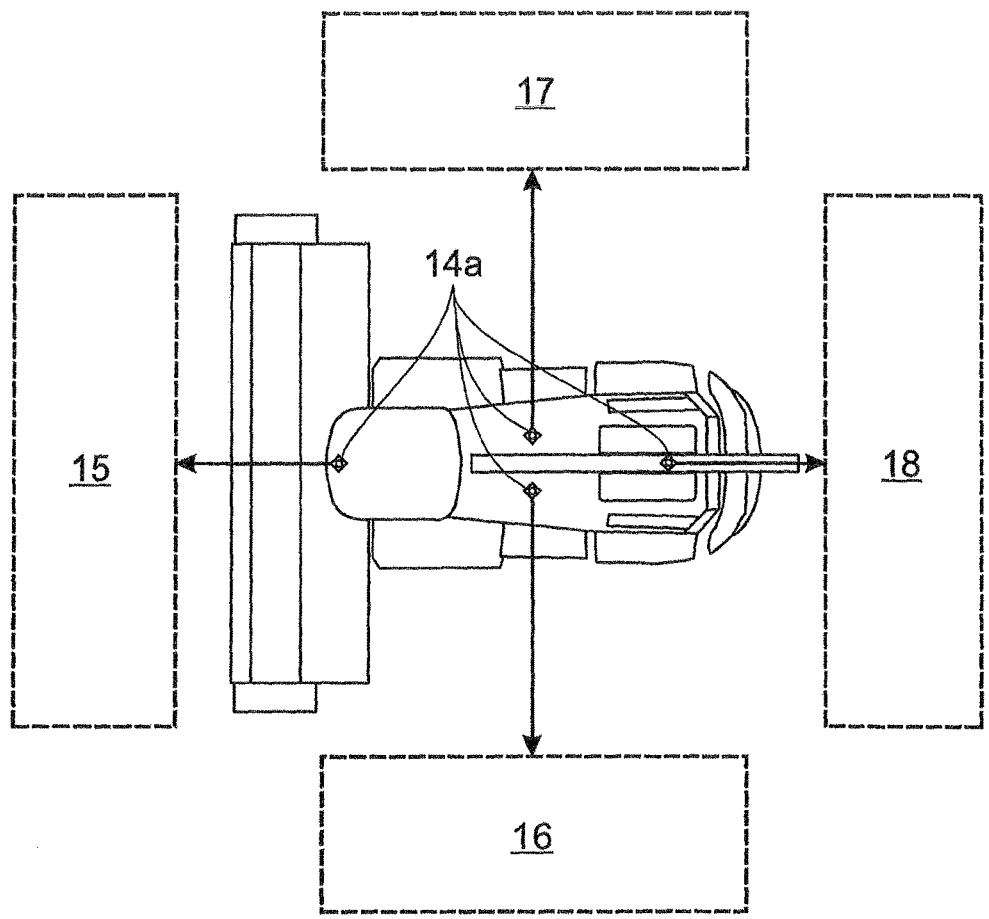
FIG. 2 depicts a top view of the combine harvester according to FIG. 1.

Also provided is an environmental sensor system 14 for detecting at least one piece or portion of environmental information, which influences the harvesting process. The environmental sensor system has a spatial area of applicability located in the environment of the harvesting machine. The area of applicability of a piece or portion of environmental information can be located, for example, in a forward area 15, a rear area 18, or a lateral area 16, 17 of the harvesting machine (FIG. 2).

The environmental sensor system 14 is disposed on the harvesting machine, as shown. Alternatively thereto, however, environmental sensor system 14 also can be provided, on another harvesting machine (of the harvesting system), which is traveling ahead. It is further conceivable that the environmental sensor system 14 is disposed on a measuring vehicle, which is separate from the harvesting machine, or is disposed separately from the harvesting machine in any other manner.

A functional system model $11b$ for at least one part of the harvesting machine is stored in the memory 11 of the driver assistance system 10, wherein the computing unit 12 carries out the aforementioned, autonomous determination of the at least one threshing-unit parameter $1a$, $1b$, based on the system model $11b$.

The functional system model $11b$ is a computational model for depicting functional interrelations within the combine harvester. Specifically, at least one family of characteristics A, B is assigned to at least one harvesting-process parameter by the system model $11b$, wherein this harvesting-process parameter is defined, in this case, as an output variable of the at least one family of characteristics A, B, and wherein at least one machine parameter is defined as the input variable of the at least one family of characteristics A, B.

Two exemplary families of characteristics A, B, are illustrated in FIGS. $4a$ and $4b$. In this case, the harvesting-process parameter "material feed height" and a machine parameter, preferably the machine parameter "drum speed" or the machine parameter "concave width", are defined as input variables for the at least one family of characteristics A, B.

Figure 4A:
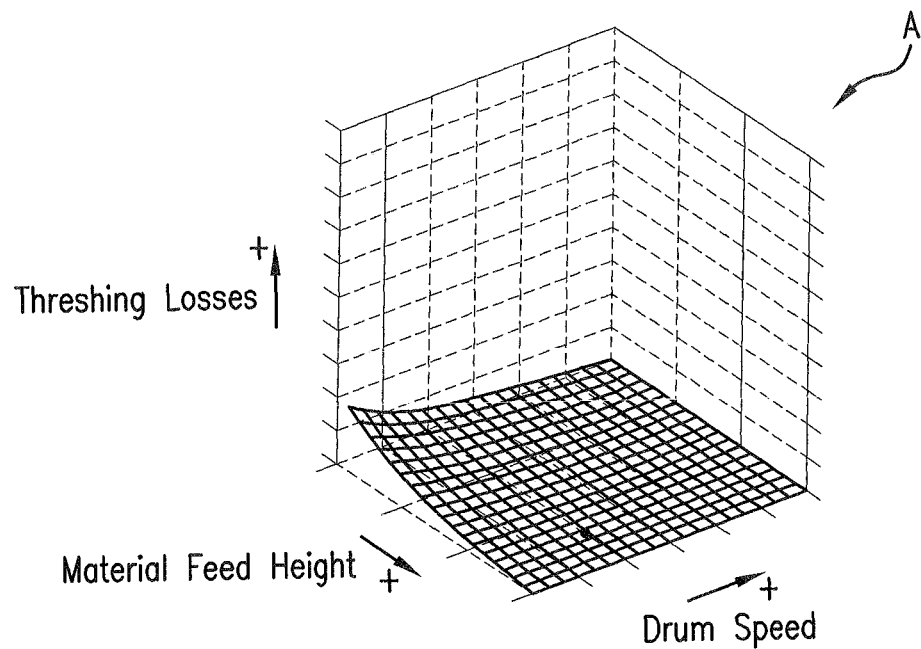
FIG. 4a depicts an exemplary families of characteristics A of the system model for the harvesting-process parameter "threshing losses" having the input variables a) "material feed height" and "drum speed"
Figure 4B:
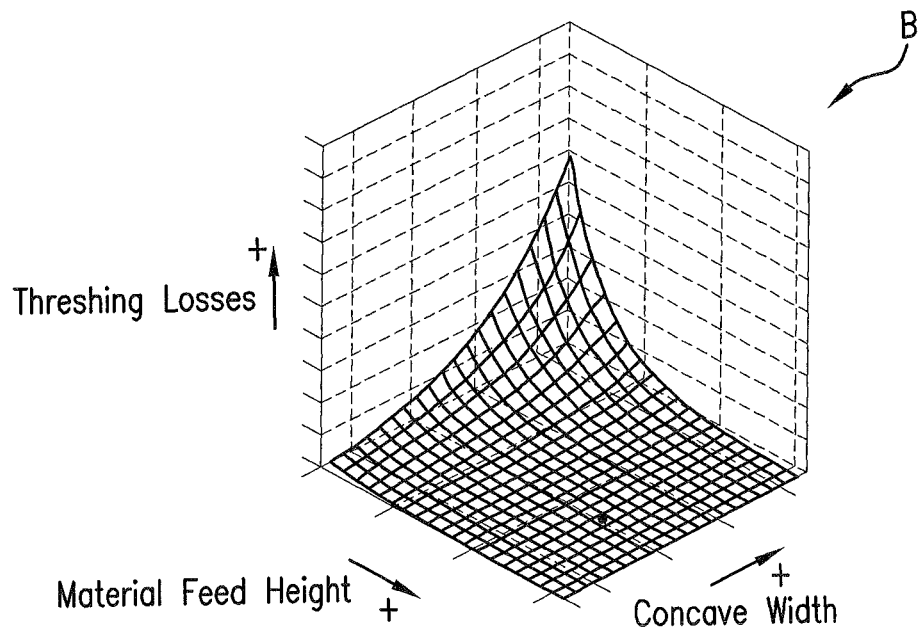
FIG. 4b depicts an exemplary families of characteristics B of the system model for the harvesting-process parameter "threshing losses" having the input variables "material feed height" and "concave width".

In order to depict the functional interrelations, which relate to the threshing unit 1, for example, between one harvesting-process parameter as the output variable and different input variables, a first family of characteristics A and a second family of characteristics B are preferably assigned to this harvesting-process parameter. In this case, the input variables for the first family of characteristics A are the further harvesting-process parameter "material feed height" and the machine parameter "drum speed" (FIG. $4a$), while the further harvesting-process parameter "material feed height" and the machine parameter "concave width" form the input variables for the second family of characteristics B (FIG. 4).

As used herein, the term "material feed height" should be broadly interpreted and includes both the material feed height of the crop stream picked up by the threshing unit 1, in the narrower sense, as well as the throughput of the crop stream passing through the threshing unit 1. In this regard, all the interpretations of the material feed height apply equally to the throughput. In particular, the term "material feed height" can be replaced by the term "throughput" in the present case.

Corresponding families of characteristics for the harvesting-process parameters "threshing losses" and "separation losses", the harvesting-process parameter "slip threshing-unit drive" representing the threshing-unit load, the harvesting-process parameter "broken grain portion" and the harvesting-process parameter "cleaning losses" are provided in the system model.

The computing unit 12 operates as a characteristic control on the basis of the system model 11*b*. Very generally, this means that the computing unit 12 utilizes the at least one family of characteristics of the system model 11*b* as the basis for the autonomous determination of the machine parameters. Reference is made to the general part of the description with respect to the broad meaning of the term "control".

In the determination of the machine parameters, the computing unit 12 defines or modifies the system model 11*b* depending on at least one piece or portion of environmental information. Alternatively or additionally, the computing unit 12 superimposes a control circuit, which is based on at least one piece or portion of environmental information, on the characteristic control.

The superimposition of the characteristic control with a control circuit, in the simplest case, means that the computing unit calculates or modifies the machine parameter to be determined on the basis of at least one piece or portion of environmental information. The superimposition of the characteristic control with a control circuit can also mean, however, that a control circuit of the characteristic control is interlaced with the control circuit, which is based on the at least one piece or portion of environmental information.

In the harvesting machine of the inventive system, at least one working unit, i.e., the threshing unit 1 in this case, together with the driver assistance system 10, forms an automated working unit, i.e., an automated threshing unit in this case. This is realized according to the invention in that a plurality of selectable harvesting-process strategies 11*a* is stored in the memory 11 and, in order to implement the selected harvesting-process strategy 11*a* or the harvesting-process strategies 11*a*, the computing unit 12 is configured, e.g., programmed to autonomously determine at least one machine parameter for the threshing unit 1 and specify the machine parameter to the threshing unit 1. In this manner, an automated threshing unit is provided, which comprehensively regulates all variables that are relevant for the work of the threshing unit 1, such that the variables are coordinated with one another. The situation is therefore avoided, in particular, in which there are conflicting controls which come from different directions and could possibly cancel each other out. Instead, the control of all relevant parameters is carried out "under one roof". In addition, the driver 13 can specify a desired qualitative result and does not need to have his own expert knowledge of the details required for this result.

The determination of the machine parameters is an autonomous determination to the extent that, in principle, the harvesting-process strategy 11*a* is implemented by the computing unit 12 without the need for intervention by the driver 13 or for a query to the driver 13 during the determination of the threshing-unit parameters 1*a*, 1*b* in the narrower sense. Such an intervention by the driver 13 is therefore still possible, in principle, but is not necessary. In this case, the stored harvesting-process strategies 11*a* differ in terms of the objective of setting or optimizing harvesting-process parameters, which will be explained further below.

It should be noted that the driver assistance system 10 can be centrally designed, in principle. The driver assistance system is used to control not only the threshing unit 1, but also working units installed upstream and downstream, such as the header 2, the slope conveyor 3, the separation system 6, the cleaning system 7 and the spreader system 8. It also is conceivable that the driver assistance system 10 is decentrally structured and is composed of a number of individual control systems. It can then be provided, for example, that at least a portion of the working units of the harvesting machine each have an assigned, decentralized control system.

The computing unit 12 is designed to cyclically determine the machine parameters and assign these to the particular working unit. Alternative or additionally, the computing unit 12 is designed to cyclically define or modify the system model 11*b*. The term "cyclical" is intended to be interpreted broadly and, in the present case, refers to a continuous determination, definition or modification having a cycle time that is constant but also varies.

In addition to the environmental sensor system 14, preferably assigned to the harvesting machine is a harvesting-process sensor system 19 having multiple harvesting-process sensors for determining harvesting-process parameters resulting from the harvesting process, such as "threshing losses", "broken grain portion", "material feed height", "separation losses", "cleaning losses", "slip threshing-unit drive", "fuel consumption", wherein the computing unit 12 accounts for the harvesting-process parameters generated by the harvesting-process sensor system 19 in the determination of the machine parameters.

The harvesting-process sensor system 19 is equipped with multiple sensors. For example, the harvesting-process sensor system 19 comprises a grain sensor 19*a* for detecting a piece of grain information. As shown in the illustration of FIG. 1, the grain sensor 19*a* can be designed as a grain camera system. The grain sensor 19*a* is for detecting an aforementioned broken grain portion, a portion of material other than grain, an awn-grain portion and/or an ear-tip portion. Alternatively or additionally, the harvesting-process sensor system 19, as also depicted in FIG. 1, can comprise a swath sensor 19*b* for ascertaining a piece or portion of swath information. A swath sensor 19*b*, when suitably designed, is used to detect a grain portion in the swath. Such a grain portion therefore represents a loss of grain.

The environmental sensor system 14 preferably comprises multiple environmental sensors 14*a*, 14*b* for generating environmental sensor data, wherein the environmental sensor system 14 includes a data preparation unit 20, which generates environmental information from the environmental sensor data and provides said data to the driver assistance system 10. The data preparation unit 20 also may merely transfer the environmental sensor signals of individual environmental sensors 14*a*, 14*b* to the driver assistance system 10.

The data preparation unit 20 interacts in the aforementioned manner not only with the environmental sensors 14*a*, 14*b*, but also with the harvesting-process sensors 19*a*, 19*b* of the harvesting-process sensor system 19, and generates the corresponding harvesting-process parameters from the harvesting-process sensor data. In this regard, the data preparation unit 20 has a dual role. The data preparation unit 20 may merely transfer the harvesting-process sensor signals of individual harvesting-process sensors 19*a*, 19*b* to the driver assistance system 10.

The environmental sensors 14a, 14b gather environmental sensor data on particulars relating to the field crop, in particular, the crop. In an embodiment, at least one environmental sensor 14a, 14b is a distance sensor, an imaging sensor, a moisture sensor, a temperature sensor, or the like. In this case, optical sensors, in particular, camera sensors and/or laser sensors and/or radar sensors can be used. In FIG. 1, the environmental sensor 14a is an imaging sensor in the form of a 3D camera, whereas the environmental sensor 14b is designed as a moisture sensor for generating a piece of environmental information relating to the crop moisture. Other possibilities are to gather information on the crop height, the crop width, the crop density, or the like, using further environmental sensors.

The data preparation unit 20 makes it possible to generate numerous bits of environmental information from the particular environmental sensor data. This preferably includes environmental information relating to the field crop such as "crop density," "crop height," "crop composition," "crop ripeness," "down crop information," "foreign plant portion," "green forage portion," "crop subsoil," "crop edge geometry," or the like. This also preferably includes environmental information relating to the geometric conditions of the field comprising the field crop in the particular area of applicability such as "obstacle encountered," "ground topology," or the like. Finally, this includes environmental information relating to the field environment in the particular area of applicability, such as "dust encountered," "ambient temperature," "ambient humidity," or the like.

Given that the data preparation unit 20 is coupled to multiple environmental sensors with respect to data acquisition, it can be readily provided that the data preparation unit 20 generates a piece or portion of environmental information from at least two different environmental sensors. For example, the data preparation unit 20 determines, from the environmental sensor data, the environmental information relating to the crop density and the crop height and, on the basis thereof, determines the environmental information relating to the crop volume. Alternatively or additionally, the data preparation unit 20 determines, from the environmental sensor data, the environmental information relating to the crop density, the crop height and the crop moisture and, on the basis thereof, determines the environmental information relating to the crop mass.

As a result of the accounting for the areas of application 15-18 of the environmental information by the computing unit 12 in the determination of the machine parameters, the invention ensures that the environmental information is applied in the control deliberately and at the right time. Preferably, the areas of application 15, 16, 17 and 18 (FIG. 2) of the environmental information are each stored or can be stored in the memory 11.

In a case in which the spatial area of applicability of a piece or portion of environmental information can change relative to the harvesting machine, it is advantageous if the environmental sensor system 14 transfers not only the environmental information but also the spatial area of applicability of the environmental information to the driver assistance system 10. Such a changeability of the area of applicability can result, for example, from a change in the parameterization of the particular environmental sensor 14a, 14b, such as a change in the position of an environmental sensor designed as a camera.

On the basis of environmental information that does not affect the harvesting process until a future time, the computing unit 12, together with the particular assigned areas of application and the travel parameters of the harvesting machine, such as ground speed and wheel track, generates a prediction for at least one piece of environmental information that will prevail at the harvesting machine at a future process time. In particular, the computing unit 12 autonomously determines for this process time at least one machine parameter on the basis of the predicted environmental information and, if necessary, on the basis of further information, and specifies the machine parameter to the particular working unit at the process time or at a time that is prior to the process time and accounts for an adjustment time of the machine parameter. Therefore, an adjustment of machine parameters for a process time is possible using a current database for precisely this process time.

A few examples of the resultant behavior of a harvesting system, according to the invention, comprising a harvesting machine designed as a combine harvester are described in the following on the basis of the working unit of a threshing unit 1 therein. The threshing unit 1 is controlled, in the manner described above, via a specification of the machine parameters "drum speed" and "concave width." The resultant behavior of the harvesting system results from the definition or modification of the families of characteristics, according to the invention, or from the superimposition of the characteristic control with a control circuit based on the environmental information.

In a first variant of a machine behavior according to the invention, in the event of an increase in the environmental information "green forage portion" and/or "foreign plant portion" and/or "crop height" and/or "crop density", the computing unit 12 deduces that an increase in the threshing-unit load is imminent and, in order to reduce the threshing-unit load, increases the concave width and/or increases the drum speed.

In a second variant of a machine behavior according to the invention, in the event of a reduction of the environmental information "crop density", the computing unit 12 deduces that an increase in the threshing losses is imminent and, in order to reduce the threshing losses, provides that the concave width is reduced and/or that the drum speed is increased.

In a third variant of a machine behavior according to the invention, the computing unit 12 reduces the threshing drum speed in response to a reduction in the crop moisture and an increase in the broken grain portion.

The generated environmental information are advantageously utilized not only in the control of working units, but also in the control of the ground drive of the harvesting machine. Preferably, the harvesting machine comprises a ground drive control 21, wherein the ground drive control 21 adjusts the ground speed of the harvesting machine depending on the environmental information. For example, the ground drive control 21 adjusts a specified crop throughput depending on crop volume and/or crop mass. Alternatively or additionally, the ground drive control 21 also is used to generate set wheel tracks, which are implemented by a steering drive. It is possible, therefore, to orient the set wheel tracks with respect to crop edges or to avoid obstacles, on the basis of the environmental information.

LIST OF REFERENCE NUMBERS

1 threshing unit
1a drum speed
1b concave width 1b
2 header
3 slope conveyor
4 threshing drum 5 threshing concave
6 separation system
7 cleaning system
8 transport system
9 grain tank
10 driver assistance system
11 memory
11a harvesting-process strategy
11b system model
12 computing unit
13 driver
14 environmental sensor system
14a camera
14b moisture sensor
15-18 areas of applicability
19 harvesting-process sensor system
19a grain sensor
19b swath sensor
20 data preparation unit
21 ground drive control
A, B families of characteristics As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A self-propelled harvesting machine, comprising:
   multiple working units for processing crop picked up from a field;
   a driver assistance system for sensor-supported control of the working units, the driver assistance system comprising a memory for storing data and a computing unit for processing the data;
   an environmental sensor system for detecting environmental information that influences a harvesting process and that has one or more spatial areas of applicability located in an environment of the harvesting machine; and
   a functional system model for at least one part of the harvesting machine that is stored in the memory;
   wherein the computing unit functions as a characteristic control based on the functional system model, autonomously determines machine parameters of a particular working unit of the multiple working units and specifies the determined machine parameters to the particular working unit; and
   wherein during the autonomous determination of the machine parameters, the computing unit: defines or modifies the system model based on the environmental information, superimposes a control circuit based on the environmental information, on the characteristic control, or both.

2. The harvesting machine according to claim 1, wherein at least one working unit of the multiple working units, together with the driver assistance system, forms at least one automated working unit, wherein a plurality of selectable harvesting-process strategies is stored in the memory and wherein, in order to implement a selected harvesting-process strategy of the plurality of selectable harvesting-process strategies, the computing device autonomously determines at least one machine parameter and specifies the determined at least one machine parameter to the working unit.

3. The harvesting machine according to claim 1, wherein the computing unit cyclically defines or modifies the machine parameters and specifies the defined or modified machine parameters to the particular working unit.

4. The harvesting machine according to claim 1, wherein the computing unit cyclically defines or modifies the system model.

5. The harvesting machine according to claim 1, further comprising a harvesting-process sensor system having multiple harvesting-process sensors for determining harvesting-process parameters resulting from the harvesting process and wherein the computing unit relies upon the harvesting-process parameters generated by the harvesting-process sensor system in the autonomous determination of the machine parameters.

6. The harvesting machine according to claim 1, wherein the environmental sensor system comprises multiple environmental sensors for generating environmental sensor data and includes a data preparation unit that generates environmental information from the environmental sensor data and provides the generated environmental sensor data to the driver assistance system.

7. The harvesting machine according to claim 6, wherein the data preparation unit generates, from the environmental sensor data, environmental information relating to a field crop in a particular area of applicability selected from the group consisting of: "crop density," "crop height," "crop composition," "crop ripeness," "down crop information," "foreign plant portion," "green forage portion," "crop subsoil," and "crop edge geometry".

8. The harvesting machine according to claim 6, wherein the data preparation unit generates, from the environmental sensor data, environmental information relating to geometric conditions of the field comprising the field crop in a particular area of applicability defined as "obstacle encountered," "ground topology" or both.

9. The harvesting machine according to claim 6, wherein the data preparation unit generates, from the environmental sensor data, environmental information relating to a field environment in the spatial area of applicability selected from the group consisting of: "dust encountered," "ambient temperature" and "ambient humidity".

10. The harvesting machine according to claim 6, wherein the data preparation unit generates environmental information from at least two different environmental sensors.

11. The harvesting machine according to claim 6, wherein the data preparation unit determines, from the environmental sensor data, the environmental information relating to the crop density and the crop height and based thereon determines the environmental information relating to crop volume.

12. The harvesting machine according to claim 7, wherein the data preparation unit determines, from the environmental sensor data, the environmental information relating to the crop density, the crop height and the crop moisture and, based thereon determines environmental information relating to crop mass.

13. The harvesting machine according to claim 1, wherein the computing unit takes the one or more spatial areas of applicability of the environmental information into account in the autonomous determination of the machine parameters.

14. The harvesting machine according to claim 13, wherein one of the one or more spatial areas of applicability of the environmental information are located in a forward area of the harvesting machine, a rear area of the harvesting machine, or a lateral area of the harvesting machine and wherein the environmental sensor system transfers not only the environmental information but also a spatial area of applicability of the environmental information to the driver assistance system.

15. The harvesting machine according to claim 14, wherein the computing unit generates a prediction for a portion of environmental information that will prevail at the harvesting machine at a future process time, and wherein, on the basis of the environmental information, at least the spatial area of applicability and travel parameters such as ground speed and wheel track, the computing unit autonomously determines, for the future process time, at least one machine parameter on the basis of the predicted environmental information, specifies the machine parameter to the specified working unit at the process time or at a time that is prior to the process time and accounts for an adjustment time of the machine parameter.

16. The harvesting machine according to claim 1, wherein the specified working unit is a threshing unit having a threshing drum and a threshing concave and is controlled via a specification of the machine parameters "drum speed" and "concave width".

17. The harvesting machine according to claim 16, wherein in response to an increase in the environmental information selected from the group consisting of: "green forage portion," "foreign plant portion," "crop height" and "crop density", the computing unit increases the concave width, increases the drum speed, or both, in order to reduce a threshing-unit load.

18. The harvesting machine according to claim 16, wherein in response to a reduction of the environmental information "crop density," the computing unit reduces the concave width, increases the drum speed or both in order to reduce threshing losses.

19. The harvesting machine according to claim 16, wherein in response to a reduction in crop moisture and an increase in the broken grain portion, the computing unit reduces a threshing drum speed.

20. The harvesting machine according to claims 16, further comprising a ground drive and a ground drive control, wherein the ground drive control adjusts a ground speed of the harvesting machine depending on the environmental information.

21. The harvesting machine according to claims 16, further comprising a ground drive and a ground drive control, wherein the ground drive control adjusts a specified crop throughput depending on crop volume, crop mass or both.

22. A harvesting system comprising the harvesting machine of claim 1.

* * * * *